United States Patent [19]

Kitamori

[11] 4,168,353
[45] * Sep. 18, 1979

[54] PROCESS FOR PRODUCING FOAMABLE POLYETHYLENE RESIN PARTICLES

[75] Inventor: Yoshiaki Kitamori, Nara, Japan

[73] Assignee: Sekisui Kaseihin Kogyo Kabushiki Kaisha, Nara, Japan

[*] Notice: The portion of the term of this patent subsequent to May 25, 1993, has been disclaimed.

[21] Appl. No.: 876,287

[22] Filed: Feb. 8, 1978

Related U.S. Application Data

[63] Continuation of Ser. No. 679,126, Apr. 21, 1976, abandoned, which is a continuation-in-part of Ser. No. 426,752, Dec. 20, 1973, Pat. No. 3,959,189.

[51] Int. Cl.$^2$ .................................................. C08J 9/14
[52] U.S. Cl. ........................................ 521/59; 521/60; 521/139
[58] Field of Search ...................... 260/2.5 B, 2.5 HA

[56] References Cited

U.S. PATENT DOCUMENTS

| | | | |
|---|---|---|---|
| 3,413,244 | 11/1968 | Landler et al. | 260/2.5 HA |
| 3,651,183 | 3/1972 | Hosoda et al. | 260/2.5 HA |
| 3,959,189 | 5/1976 | Kitamori | 260/2.5 B |

Primary Examiner—Morton Foelak
Attorney, Agent, or Firm—Sughrue, Rothwell, Mion, Zinn and Macpeak

[57] ABSTRACT

A process for producing foamable polyethylene resin particles which comprises suspending in an aqueous medium polyethylene resin particles having an MI value of 0.3 to 10, a density of less than 0.93 g/cm$^3$ and a softening point below 90° C., adding to the suspension 30 to 300% by weight based on the weight of the particles of a styrene monomer and a catalyst for polymerizing the monomer, polymerizing the monomer, and impregnating a blowing agent in the polyethylene resin particles containing the polymerized styrene resin to form foamable polyethylene resin particles.

9 Claims, No Drawings

PROCESS FOR PRODUCING FOAMABLE POLYETHYLENE RESIN PARTICLES

CROSS-REFERENCE TO RELATED APPLICATIONS

This is a continuation of application Ser. No. 679,126 filed Apr. 21, 1976, now abandoned, which is in turn a continuation-in-part application of U.S. Application Ser. No. 426,752, filed Dec. 20, 1973 now U.S. Pat. No. 3,959,189 issued 5-25-76, and entitled PROCESS FOR PRODUCING POLYETHYLENE RESIN PARTICLES AND FOAMABLE POLYETHYLENE RESIN PARTICLES.

BACKGROUND OF THE INVENTION

1. Field of the Invention

The present invention relates to a process for producing foamable polyethylene resin particles. In greater detail, the present invention relates to a process for producing foamable polyethylene resin particles containing a polystyrene resin uniformly dispersed therein and having a good molding property which can be pre-foamed to a low bulk density and can form moldings having good rigidity, from which suitable articles can be produced by adding a blowing agent to the polyethylene resin particles to form foamable polyethylene resin particles, heating the particles to produce pre-foamed particles, charging the pre-foamed particles into a mold cavity which permits the escape of gases but retains the foamable polyethylene resin articles, and heating them.

2. Description of the Prior Art

In order to produce foamable polyethylene resin particles which can be pre-foamed to a low bulk density, it is necessary to impregnate a blowing agent consisting of volatile aliphatic hydrocarbons such as n-butane, isobutane, n-pentane, isopentane and dichlorodifluoromethane in polyethylene resin particles. However, although the particles containing the blowing agent can be foamed to a low bulk density just after production thereof, it is necessary to leave the particles for a definite period because the cells produced just after production are very unstable, because polyethylene resin has a high gas permeability. Consequently, there is the disadvantage that particles having a high bulk density can be produced if the particles are allowed to stand, because the blowing agent disappears on standing. Accordingly, methods for producing foamable polystyrene resin particles, for example, a method which comprises suspending polystyrene resin particles in an aqueous medium and adding a small amount of a solvent which dissolves the resin particles and a blowing agent to the resulting suspension to impregnate the blowing agent in the resin particles, and a method which comprises blending polystyrene resin particles and a blowing agent in an extruder, molding by extruding as thin strands, quenching immediately and pelletizing the strands, cannot be applied to the production of the foamable polyethylene resin particles. Even if such methods can be adopted, molding conditions are very severe because the viscoelasticity of the polyethylene at foaming is less than that of the polystyrene resin, and consequently it is difficult to produce preferred articles and moldings.

A process for cross-linking polyethylene resin has been suggested as a means for preventing the disappearance of the blowing agent consisting of the volatile aliphatic hydrocarbons included in the foamable polyethylene resin particles and as a means for adjusting the viscoelasticity at foaming. Namely, a method is known which comprises impregnating the blowing agent using many techniques and cross-linking the polyethylene resin by applying radiant rays before the blowing agent disappears, and, therefore, is lost. According to this method, the cost of the equipment is high, although cross-linking can be carried out in a short period of time. Therefore, this method is not economically preferred, because the foamable polyethylene resin particles produced are expensive. Further it is taught in U.S. Pat. No. 3,743,611 that cross-linking of a polyethylene resin, polymerization of a styrene monomer and permeation of a blowing agent can be simultaneously conducted in a suspension to disperse the polystyrene resin into polyethylene particles uniformly, whereby escape of the blowing agent is prevented and a molding having improved rigidity can be obtained. However, in this method, since cross-linking and impregnation are carried out at the same time, the impregnation of the blowing agent is, of course, carried out at the cross-linking temperature. Accordingly, where n-propane, n-butane, dichlorodifluoromethane, chlorodifluoromethane and dichlorotetrafluoromethane, etc., which are always gaseous at normal temperature and pressure, are used as a blowing agent, the pressure abnormally increases. Thus, if the cross-linking and the impregnation are carried out under such conditions, the polyethylene resin particles are flattened by such high pressures prior to the completion of cross-linking and good foamable polyethylene resin particles cannot be obtained. Further, in order to carry out this method at such high pressures, it is necessary to use a high pressure, high temperature reactor.

Further, since the polymerization of the styrene monomer is carried out in the presence of the blowing agent, there are disadvantages in that the blowing agent causes a decrease in the viscosity of the styrene monomer and consequently a long period of time is required for polymerization, whereby the quantity of the styrene monomer used is limited to below 20% by weight based on the polyethylene resin particles. Further, it simultaneously becomes difficult to control the polymerization and the formation of fine powders becomes high. In addition, the polyethylene resin particles contain polystyrene resin having a low degree of polymerization due to the viscosity decrease, and, as a result, when pre-foamed particles are produced therefrom by heating, cells in the pre-foamed particles become nonuniform or pre-foamed particles having an excellent molding property cannot be obtained, because the second foaming ability thereof is decreased. Finally, articles having excellent rigidity cannot be obtained. Moreover, in the case of using a gaseous blowing agent such as n-propane, n-butane or dichlorotetrafluoroethane, it is necessary to use a high pressure autoclave because the reaction system is under a high pressure.

SUMMARY OF THE INVENTION

As the result of research, in view of the above described numerous disadvantages of the prior art, on a process for producing foamable polyethylene resin particles having an excellent molding property, high foaming ability (which is the same as or nearly equal to that of the prior foamable polystyrene particles) and good rigidity, wherein the disappearance of the blowing agent is prevented and the properties of the polyethylene resin itself are not deteriorated, the present inventor found that all of the above disadvantages encountered with prior polyethylene resins can be overcome by adding a polystyrene resin to specific polyethylene resin particles in an amount of 30 to 300% by weight, preferably 30 to 180% by weight, more preferably 30 to 100% by weight, based on the polyethylene resin particles and dispersing the polystyrene resin therein. Namely, the present invention provides a process to accomplish the above described advantages over the prior art and includes a process for producing foamable polyethylene resin particles which comprises suspending polyethylene resin particles having an MI value of 0.3 to 10, a density of less than 0.93 g/cm$^3$ and a softening point below 90° C., preferably below 85° C., in an aqueous medium, adding to this suspension 30 to 300% by weight, preferably 30 to 180% by weight, more preferably 30 to 100% by weight, based on the weight of the polyethylene resin particles of a styrene monomer and a catalyst for polymerizing the styrene monomer, polymerizing the styrene monomer, and incorporating a blowing agent in the resulting polyethylene resin particles which contain a polystyrene resin foamed by the polymerization of the styrene monomer, wherein the blowing agent does not dissolve the polyethylene resin particles or only slightly swells the polyethylene resin particles.

DETAILED DESCRIPTION OF THE INVENTION

The polyethylene resins used in the process of the present invention include ethylene homopolymers and copolymers containing ethylene as the major component, e.g., more than 50% by weight, such as an ethylene-vinyl chloride copolymer, an ethylene-vinyl acetate copolymer and ethylene-methyl methacrylate copolymer, which are in the form of globular particles or pellets. Particularly in the present invention, polyethylene resins having an MI value of 0.3 to 10, a density less than 0.93 g/cm$^3$ and a softening point below 90° C., more preferably below 85° C., are used. While the lower limits of the density and the softening points of the polyethylene are not limiting, the generally encountered lower limits from a practical standpoint are a density of about 0.915 g/cm$^3$ and a softening point of about 85° C. Namely, if the polyethylene resin particles have a density greater than 0.93 g/cm$^3$ and a softening point above 90° C., the styrene monomer is not rapidly absorbed into the polyethylene resin particles and polyethylene resin particles uniformly containing the polystyrene resin cannot be obtained. On the other hand, if foamable polyethylene resin particles uniformly containing the polystyrene resin are produced from a polyethylene resin having an MI value above 10 by adding the blowing agent, the retention of the blowing agent is low and particles having a desired bulk density cannot be obtained by heating. However, by using polyethylene resin particles having an MI value of 0.3 to 10, retention and foaming ability of the blowing agent are remarkably improved. A suitable particle size which can be effectively used ranges from about 0.5 to 5 mm, preferably 2 to 4 mm. Further, by using polyethylene resin particles having a density less than 0.93 g/cm$^3$ and a softening point below 90° C., more preferably below 85° C., the absorption of the styrene monomer can be rapidly carried out and consequently it becomes possible to produce particles wherein the polystyrene resin formed by the polymerization is uniformly dispersed.

In the process of the present invention, styrene monomers are used. The styrene monomers which can be used include styrene and mixtures of styrene, in an amount of more than 50% by weight of styrene, and copolymerizable monomers, for example, mixtures of styrene and α-methylstyrene, acrylonitrile, methyl methacrylate, dimethyl maleate or divinylbenzene, etc.

The amount of the above described styrene monomers which can be used is 30 to 300%, preferably 30 to 180% and more preferably 30 to 100%, by weight based on the weight of the polyethylene resin particles.

One of characteristics of the process of the present invention is to use the styrene monomer in an amount within the above described range based on the weight of the polyethylene resin particles. Namely, if foamed polyethylene resin articles are produced from only a polyethylene resin, they are not suitable for using as packaging materials for heavy articles because they are too elastic, although they do have excellent characteristics in that they do not produce a black smoke when burned and they do have good oil resistance and solvent resistance. On the other hand, if foamed polystyrene resin articles are produced from only a polystyrene resin, the polystyrene resin moldings generate black smoke when burned and have inferior oil resistance and solvent resistance, although polystyrene resin moldings have good rigidity. On the contrary, if polyethylene resins containing a styrene resin which are produced by the process of the present invention using polyethylene resin particles as a base resin are used for molding, the foamed polyethylene resin articles produced have both the characteristics of the polystyrene resin and the polyethylene resin. If the amount of the styrene monomer is below 30% by weight, the resulting articles have poor rigidity and it is impossible to produce moldings having a low bulk density because the blowing agent cannot be sufficiently retained in the particles.

On the other hand, if the amount is above 300% by weight, the characteristics of the polyethylene resin itself (the base resin) are lost and the styrene monomer is not completely absorbed in the polyethylene resin particles, whereby the amount of fine polystyrene powder increases and the particles are apt to bond each other upon impregnation of the blowing agent. Further, the resulting articles have inferior solvent resistance, oil resistance and impact strength.

The styrene monomer is easily and rapidly absorbed in the polyethylene resin particles when it is added to the polyethylene resin particles with the absorption generally taking less than 1 hour. However, it is more preferable to add the styrene monomer slowly than to add it all at once. In general, the styrene monomer is added as follows; that is, polyethylene resin particles are dispersed in an aqueous medium prepared by adding 0.01 to 5%, preferably 0.2 to 1%, by weight based on the weight of the water of a suspending agent such as water soluble high molecular weight materials, e.g., polyvinyl alcohol or methyl cellulose and slightly water soluble inorganic materials, e.g., calcium phosphate or magnesium pyrophosphate, and then the styrene monomer is added thereto. Basically any of the conventionally known and commonly used suspending agents for polymerization can be employed. These agents are well known in the art and can be freely selected by one skilled in the art. Water is used in an amount generally from about 0.7 to 5, preferably 0.8 to 2 times that of the particles employed in the aqueous suspension, on a weight basis.

In the polyethylene resin containing the styrene monomer absorbed therein, the polymerization of the styrene monomer is carried out using catalysts.

In the process of the present invention, catalysts are used for polymerizing the styrene monomer. As such catalysts, those suitable for suspension polymerization are generally used with the catalyst being used in an amount of about 0.05 to 2 percent by weight, preferably 0.1 to 1 percent by weight, based on the weight of the styrene monomer. Examples of suitable catalysts include organic peroxides such as benzoyl peroxide, lauroyl peroxide, t-butyl perbenzoate and t-butyl perpivalate and azo compounds such as azobisisobutylonitrile and azobisdimethylvaleronitrile. These catalysts can be used alone or as a combination of two or more thereof. These catalysts are used in the process of the present invention by dissolving the catalyst in the styrene monomer to be absorbed in the polyethylene resin particles or by dissolving the catalyst in a solvent which does not have an adverse influence on the polymerization reaction. Such solvents include toluene, benzene and 1,2-dichloropropane, etc.

The polymerization of the styrene monomer absorbed in the polyethylene resin particles proceeds in the interior of the polyethylene resin particles. When the polymerization is completed, the polyethylene resin particles containing the polystyrene resin uniformly dispersed therein are obtained.

Thus resulting polyethylene resin particles which contain the polystyrene resin uniformly dispersed therein are different from a polymer product prepared by merely mixing polyethylene and polystyrene and are used as raw materials for producing foamable polyethylene resin particles and as raw materials for producing foamed polyethylene resin articles such as sheets, rods and pipes using an extruder. In the case of producing articles using an extruder, if conventional polyethylene resins are used, the shape just after molding changes with the passage of time. For example, if a foamed polyethylene resin sheet having a thickness of about 1 mm is left in a free state just after extrusion, the thickness becomes about 2 mm. This change is not uniform and is generally affected by a temperature at which the extrudate is left, the period of time and another factors. Consequently, it is difficult to control these changes in shape. Thus, presently, a method is usually adopted which comprises cross-linking in the extruder to produce cross-linked foamed polyethylene resin articles which do not undergo a change in shape with the passage of time. On the contrary, when polyethylene resin particles containing the polystyrene resin uniformly dispersed therein produced by the process of the present invention are used for molding, foamed polyethylene resin articles can be produced which do not undergo a change in shape with the passage of time, so-called, non-ageing foamed polyethylene resin articles, without carrying out any cross-linking treatment in the extruder.

In the process of the present invention, blowing agents are used to produce foamable polyethylene resin particles. The blowing agents used have the property that they do not dissolve or only slightly swell the polyethylene resin and the polystyrene resin formed in the polyethylene resin particles. Further, the blowing agents should have a boiling point lower than the softening point of the polyethylene resin and should be gaseous or liquid at room temperature (about 20° to 30° C.) and normal pressure (about atmospheric). These blowing agents are well known in the art and generally have boiling points ranging from −42° to 80° C., more generally −10° to 36° C. Suitable blowing agents include aliphatic hydrocarbons such as n-propane, n-butane, isobutane, n-pentane, isopentane, n-hexane and neopentane, cycloaliphatic hydrocarbons such as cyclobutane and cyclopentane, and halogenated hydrocarbons such as methyl chloride, ethyl chloride, methylene chloride, trichlorofluoromethane, dichlorofluoromethane, dichlorodifluoromethane, chlorodifluoromethane and dichlorotetrafluoroethane, etc. These blowing agents can be used alone or as mixtures of two or more thereof. If n-butane, ethyl chloride and dichlorotetrafluoroethane which are gaseous at room temperature and normal pressure are used as a mixture, it is possible to achieve foaming to a low bulk density. The preferable amount of the blowing agent is in a range of about 5 to 20% by weight based on the weight of the formed polyethylene resin particles.

Impregnation of the blowing agent in the polyethylene resin particles is carried out by the method which comprises suspending the polyethylene resin particles produced by the process of the present invention in an aqueous medium in which the same suspending agent as that used in the polymerization is dispersed, adding the blowing agent to the resulting suspension, and stirring at a temperature of, preferably, about 40° to 80° C. A high temperature is not preferred because the particles produced become flat. If necessary, a solvent may be used. Examples of the solvent include toluene, benzene, 1,2-dichloropropane, etc.

The foamable polyethylene resin particles of the present invention can be produced using the above described method. The resulting foamable polyethylene resin particles easily foam at a temperature of above the softening point of the particles using a heating medium such as steam or hot air to produce foamed particles. These foamed particles are charged in a mold cavity which permits the escape of gases but retains the foamable polyethylene resin articles. The particles are then heated again using the above described heating medium to cause further foaming of the particles, by which the particles fuse together in a body to form a foamed polyethylene resin article having a shape corresponding to the mold.

In addition, in the process of the present invention, flame retardants, coloring agents and antistatic agents can be added, if desired.

The process of the present invention has the characteristic that the blowing agent is added after the polymerization of the styrene monomer. Namely, if the blowing agent is added during polymerization, the pressure due to the blowing agent becomes high because the polymerization is carried out at above 80° C., e.g., about 80° to 120° C. Accordingly, this approach is not economical because it is necessary to use a high pressure autoclave. Furthermore, preferred foamable polyethylene resin particles cannot be obtained because the polyethylene resin particles are flattened under such condition. However, according to the process of the present invention, since the blowing agent is added after polymerization, the blowing agent can impregnate sufficiently at a temperature below the softening point of the polyethylene resin, e.g., at about 40° to 50° C. Furthermore, since the addition of the blowing agent and the polymerization are carried out separately, a decrease in the viscosity caused by the blowing agent does not occur during polymerization, and consequently, the polymerization does not require a long period of time. Further, powdery polymers are not produced and bonding of the polymer particles does not occur. Thus, it becomes possible to use more than 30% by weight of the styrene monomer.

Foamed polyethylene resin articles produced from only a polyethylene resin or from polyethylene resins which contain a polystyrene resin formed by using below 20% by weight and particularly below 9% by weight of styrene monomer cannot be used for packaging heavy articles or as building materials, because they have low rigidity and are very elastic. On the contrary, articles produced by the process of the present invention can be used for packaging heavy articles or as building materials, becuse these moldings have high rigidity.

Moreover, a high temperature or a long period of time is necessary in order to impregnate the blowing agent in polyethylene resins which do not contain the polystyrene resin. However, according to the embodiments of the process of the present invention, since the polyethylene resin particles have a high polystyrene resin content, impregnation of the blowing agent can be carried out at a low temperature and for a short period of time. Thus, it is not necessary to use a pressure resistant reactor, and the particles do not have a flat shape.

In the foamable polyethylene resin particles produced by the process of the present invention, disappearance of the blowing agent can be minimized because the foaming polyethylene resin particles of this invention contain a large amount of the polystyrene resin and possess a good storage stability for the blowing agent and a good molding property. Further, inexpensive foamed articles can be produced since they can foam to a low density even after they are stored for a period of time.

Furthermore, foamed polyethylene resin articles prepared by mixing polyethylene resin particles containing the polystyrene resin uniformly dispersed therein with a blowing agent in an extruder by heating, and extruding the mixture to make sheets, rods or pipes do not undergo a change in size with the passage of time.

The polyethylene resin particles produced by the process of the present invention have the above described many advantages.

The present invention will be illustrated in greater detail by reference to the following Examples. Unless otherwise indicated, all parts, percents, ratios and the like are by weight. Unless otherwise indicated, in all Examples molding was conducted at 100° to 120° C.

EXAMPLE 1

2,000 g of pure water, 9 g of magnesium pyrophosphate and 0.4 g of sodium dodecylbenzene sulfonate as suspending agents were charged in a 5.6 l polymerization reactor to prepare an aqueous medium. Then 1,000 g of polyethylene resin particles having an MI value of 0.5, a density of 0.926 g/cm$^3$ and a softening point of 83° C. (commercial name: Mirason ACE-30N, produced by Mitsui Polychemical Co.) were suspended in the aqueous medium. The suspension was stirred at 320 rpm. On the other hand, 10 g of benzoyl peroxide and 1 g of tert-butyl perbenzoate were dissolved in 1,000 g of styrene monomer (100% by weight based on the particles) to prepare a monomer solution. This solution was added dropwise to the above dispersion while keeping the temperature at 85° C. Polymerization was carried out for 7 hours. After cooling, the reaction mixture was removed, and an acid was added to decompose the suspending agents. Thus, polyethylene resin particles containing a polystyrene resin were obtained. The powdery polymer formed was 0.4% by weight.

2,000 g of the resulting particles was suspended in an aqueous medium prepared by adding 9 g of magnesium pyrophosphate and 0.4 g of sodium dodecyl benzenesulfonate in 2,000 g of water with stirring at 320 rpm. Then 300 g of n-butane was introduced at 50° C. under a pressure of 7 kg/cm$^2$. The mixture was warmed to 60° C. After stirring was continued for 4 hours at this temperature, the product was cooled and removed. An acid was added to decompose suspending agents.

After allowing the resulting particles to stand for 24 hours they were dipped in boiling water for 2 minutes, by which pre-foamed particles having a bulk density of 0.02 g/cm$^3$ were obtained. As the result of examination on the condition of the cells in the interior of the pre-foamed particles by cutting the center part thereof, it was found that the foamed particles contained 80 to 150 cells per 1 mm$^2$.

These pre-foamed particles were charged in a mold cavity having a size of 400×400×50 mm which permits the escape of gases but retains the particles. Steam at a pressure of 0.8 kg/cm$^2$ was introduced into the mold cavity. After heating for 50 seconds, the mold was cooled for 2 minutes and the molding removed. The resulting articles had a density of 0.020 g/cm$^3$ and a good appearance. Further, the bulk densities of the resulting foamable polyethylene resin particles after allowing them to stand for 7 days, 10 days and 15 days were 0.027 g/cm$^3$, 0.031 g/cm$^3$ and 0.034 g/cm$^3$, respectively. Retention of the blowing agent and the molding properties of the foaming polyethylene resin were very excellent.

EXAMPLE 2

Polyethylene resin particles containing a polystyrene resin uniformly dispersed therein were produced by the same procedure as described in Example 1 but using 1,400 g of polyethylene resin particles having an MI value of 0.5, a density of 0.927 g/cm$^3$ and a softening point of 82° C. (commercial name: Yukaron HE-60, produced by Mitsubishi Petrochemical Co.), 6 g of benzoyl peroxide, 0.6 g of tert-butyl perbenzoate and 600 g of styrene (43% by weight based on the particles). The particles obtained had no agglomeration and the amount of the powdery polymer formed which passes through 40 mesh sieve (ASTM) was 0.3% by weight.

The resulting polyethylene-polystyrene resin particles were subjected to the impregnation of blowing agent and dipping in boiling water in the same manner as in Example 1 to obtain pre-foamed particles having a bulk density of 0.018 g/cm$^3$.

Further, the bulk densities of the resulting foamable polyethylene resin particles after allowing them to stand for 24 hours, 7 days and 10 days were 0.023 g/cm$^3$, 0.030 g/cm$^3$ and 0.033 g/cm$^3$, respectively.

EXAMPLE 3

2,000 g of pure water, 9 g of magnesium pyrophosphate and 0.4 g of sodium dodecylbenzene sulfonate as suspending agents were charged in a 5.6 l autoclave to prepare an aqueous medium. Then, 600 g of polyethylene resin particles having an MI value of 0.5, a density of 0.926 g/cm$^3$ and a softening point of 83° C. (commercial name: Mirason ACE-30N, produced by Mitsui Polychemical Co.) was suspended in the above aqueous medium. The suspension was stirred at 320 rpm. On the other hand, 14 g of benzoyl peroxide and 1 g of t-butyl perbenzoate as polymerization catalysts were dissolved in 1,400 g of styrene (233% by weight based on the particles) to prepare a monomer solution. This solution was added dropwise to the aqueous medium to cause absorption by the polyethylene resin particles, while polymerization was carried out by keeping the temperature at 85° C. for 10 hours. The mixture was then cooled, removed, washed with water and dried.

Then, 1,500 g of pure water, 0.3 g of sodium dodecylbenzene sulfonate as an emulsifying agent and 30 g of toluene were charged in a 4.0 l autoclave and the resulting mixture was stirred at 400 rpm. The polyethylene resin particles obtained were charged in the resulting mixture and then 300 g of n-butane was introduced under a pressure of 7 kg/cm$^2$ at room temperature. The mixture was warmed to 50° C. and after stirring was continued for 5 hours at this temperature, the product was cooled and removed. The foamable polyethylene resin particles thus obtained contained no bonded particles and contained 9% by weight of n-butane.

After allowing the foamable particles to stand for 24 hours, 7 days, 10 days and 15 days, they were dipped in boiling water for 2 minutes, whereby pre-foamed particles having bulk densities of 0.013 g/cm$^3$, 0.017 g/cm$^3$, 0.019 g/cm$^3$ and 0.021 g/cm$^3$, respectively, were obtained.

After maintaining the pre-foamed particles at room temperature for 24 hours after pre-foaming, the pre-foamed particles were charged into a mold cavity having a size of 300×300×100 mm which permits the escape of gases but retains the particles. Steam at a pressure of 0.8 kg/cm$^2$ was introduced into the mold cavity. After heating for 60 seconds, the mold was cooled with water for 3 minutes and the moldings were removed. The moldings had a good appearance and had undergone no size change.

Further, the moldings had excellent impact strength, an inherent characteristic of polyethylene resin. Furthermore, when the moldings were immersed in gasoline for 24 hours, no melt deformation was observed and it was concluded that the moldings had good oil resistance.

EXAMPLE 4

Foamable polyethylene resin particles containing polystyrene uniformly dispersed therein were produced by the same procedure as described in Example 1 but using 800 g of polyethylene resin particles having an MI value of 7, a density of 0.920 g/cm$^3$ and a softening point of 86°C. (commercial name: Sumikathene G701, produced by Sumitomo Chemical Co.), 12 g of benzoyl peroxide, 1,200 g of styrene monomer (150% by weight based on the particles) and a polymerization time of 9 hours. The foamable polyethylene resin particles obtained did not have a flat shape and an agglomeration.

After allowing the resulting particles to stand for 24 hours, they were dipped in boiling water for 2 minutes, whereby pre-foamed particles having a bulk density of 0.015 g/cm$^3$ were obtained. As a result of examining the condition of the cells in the interior of the pre-foamed particles in the same manner as in Example 1, the cells were found to be uniform.

Using these pre-foamed particles, moldings were produced in the same manner as in Example 1. The resulting moldings had a density of 0.016 g/cm$^3$ and good appearance, each of particles being completely adhered to other particles. Further, the bulk densities of the resulting foamed polyethylene resin particles after allowing them to stand for 7 days, 10 days and 15 days were 0.019 g/cm$^3$, 0.020 g/cm$^3$ and 0.022 g/cm$^3$, respectively.

EXAMPLE 5

Foamable polyethylene resin particles containing polystyrene uniformly dispersed therein were produced by the same procedure as described in Example 1 but using 500 g of polyethylene resin particles, 15 g of benzoyl peroxide, 1,500 g of styrene monomer (300% by weight based on the particles), a polymerization time of 11 hours, 250 g of n-pentane (blowing agent) and the temperature of stirring after introducing the blowing agent was kept at 50° C. The foamable polyethylene resin particles obtained had no agglomeration and contained 9.8% by weight of n-pentane.

After allowing the resulting particles to stand for 24 hours, they were dipped in boiling water for 2 minutes, whereby pre-foamed particles having a bulk density of 0.015 g/cm$^3$ were obtained. As a result of examining the conditions of cells in the interior of the pre-foamed particles by cutting the center part thereof, it was found that the foamed particles contained 60 to 100 uniform cells per 1 mm$^3$. Further, the bulk densities of the pre-foamed particles after allowing the foamable particles to stand 7 days, 10 day and 15 days were 0.017 g/cm$^3$, 0.018 g/cm$^3$ and 0.020 g/cm$^3$, respectively.

One sample of the pre-foamed particles, after being allowed to stand for 24 hours at room temperature, was charged into a mold cavity having a size of 300×300×100 mm which permits the escape of gases but retains the particles. Steam at a pressure of 0.7 kg/cm$^2$ was introduced into the mold cavity. After heating for 60 seconds, the mold was cooled for 3 minutes with water and the molding removed. The molding had a good appearance and good impact strength (an inherent characteristic of polyethylene resin) and showed no melt deformation when immersed in gasoline for 24 hours.

EXAMPLE 6

To a base resin of 50 parts of polyethylene resin particles containing polystyrene uniformly dispersed therein produced following the procedure of Example 1 (that is, the resin before immersion in the boiling water) and 50 parts of polyethylene resin particles (commercial name: Mirason ACE-30N, produced by Mitsui Polychemical Co.; same as was used in Example 1), 0.1 part of polybutene and 0.1 part of citric acid were added. The mixture was blended using a tumbler, 0.2 part of sodium bicarbonate and 0.5 part of talc were added to this mixture and sufficiently mixed. The mixture was supplied to an extruding apparatus. This extruding apparatus comprised two extruders having an inside diameter of 40 mm connected in series. Butane as the blowing agent was introduced from one end part of the first extruder (raw material feeding side) in an amount of 9.6 parts based on 100 parts of the base resin by applying pressure. The extrusion temperature was 110 to 220° C. The resin was extruded at a speed of 6.2 kg/hour from an annular slit having a diameter of 54 mm and a width of 0.35 mm provided on a cap at the end part of the second extruder into the atmosphere to cause foaming. The extrudate was then cooled while stretching by sliding on a plug surface of a cylinder having a circumference of 480 mm (diameter: 153 mm) to produce a tubular foamed sheet. This tubular foamed sheet was slit to produce a foamed sheet which had a thickness of 1.41 mm and a width of 447 mm just after extrusion and a thickness of 1.45 mm and a width of 450 mm after ageing. The density of the foamed sheet was 0.048 g/cm$^3$, and the appearance was excellent.

COMPARISON EXAMPLE 1

Polymerization was carried out following the same procedure as described in Example 1 but polyethylene resin particles having an MI value of 12 and a density of 0.915 g/cm$^3$ (commercial name: Mirason 10, produced by Mitsui Polychemical Co.) were used. Permeation of the blowing agent was carried out in the same manner as described in Example 1.

The resulting particles contained 9.1% by weight of n-butane and the bulk density thereof after ageing for 24 hours was only 0.035 g/cm$^3$, notwithstanding the fact that the shape thereof was maintained. The bulk density after 10 days was 0.071 g/cm$^3$. This means that if polyethylene resins having an MI value which is too high are used, foamed polyethylene resin particles having a high foaming enlargement cannot be obtained and retention of the blowing agent is low.

From this fact, it can be understood that polyethylene resins having an hgh MI value are not suitable for producing the foamable polyethylene resin particles of this invention.

COMPARISON EXAMPLE 2

Polymerization was carried out following the same procedure as described in Example 1 but polyethylene resin particles having an MI value of 1.0, a density of 0.935 g/cm$^3$ and a softening point of 71° C. (commercial name: Yukaron EVA-30F, produced by Mitsubishi Petrochemical Co.) were used. The powdery polymer formed was 1.2% by weight. Impregnation of the blowing agent was carried out in the same manner as described in Example 1.

The resulting particles contained 8.3% by weight of n-butane and the bulk density after ageing for 24 hours and dipping in boiling water for 2 minutes to pre-foam was 0.04 g/cm$^3$. The bulk density after ageing 7 days was 0.1 g/cm$^3$. As a result of examination of the condition of cells of the pre-foamed particles, the cells were found to be very coarse.

COMPARISON EXAMPLE 3

Polymerization was carried out following the same procedure as described in Example 1 but polyethylene resin particles having an MI value of 1.5, a density of 0.924 g/cm$^3$ and a softening point of 95° C. (commercial name: Sumikathene F213-1, produced by Sumitomo Chemical Co.) were used instead of the polyethylene resin particles used in Example. 1. Permeation of the blowing agent was carried out in the same manner as described in Example 1.

The resulting pre-foamed particles contained 8.5% by weight of n-butane and the bulk density after ageing for 24 hours was only 0.056 g/cm$^3$ notwithstanding the fact that the shape thereof was maintained.

It is clear from the above described results that polyethylene resins having a high softening point as well as polyethylene resins having an MI value of above 10 and a density of above 0.93 g/cm$^3$ are not suitable for use as raw materials for producing the foamable polyethylene resin particles of this invention.

COMPARISON EXAMPLE 4

Polymerization and permeation of the blowing agent were carried out by the same procedure as described in Example 4 except for using 400 g of the polyethylene resin particles and 1,600 g of the styrene monomer (400% by weight based on the particles) and the polymerization was carried out for 12 hours.

After allowing the resulting particles to stand for 24 hours and 7 days, they were dipped in boiling water for 2 minutes, whereby pre-foamed particles having bulk densities of 0.013 g/cm$^3$ and 0.015 g/cm$^3$, respectively, were obtained.

Using these pre-foamed particles, moldings were produced by the same procedure as described in Example 4. The moldings had a good appearance but poor impact strength and were brittle. Further, when the moldings were immersed in gasoline for 24 hours, they did not melt but showed a rapid deformation, thus, the moldings had poor oil resistance.

From the above, it can be understood that the use of styrene monomer in large amount does not maintain the characteristic of polyethylene.

COMPARISON EXAMPLE 5

Polymerization and permeation of the blowing agent were carried out by the same procedure as described in Example 1 except for using 1,600 g of polyethylene resin particles, 4 g of benzoyl peroxide and 400 g of styrene monomer (25% by weight based on the particles).

The resulting foamable polyethylene resin particles were immediately dipped in boiling water for 2 minutes, whereby pre-foamed particles having a bulk density of 0.028 g/cm$^3$ were obtained.

Further, after allowing other samples of the foamable particles to stand for 24 hours and 7 days, they were dipped in boiling water for 2 minutes, whereby pre-foamed particles having bulk densities of only 0.042 g/cm$^3$ and 0.056 g/cm$^3$, respectively, were obtained.

It can be understood from the above that the use of styrene monomer in an amount smaller than 30% by weight based on the particles does not provide a sufficient bulk density when pre-foamed.

COMPARISON EXAMPLE 6

A foamed sheet was produced following the same procedure as described in Example 6 but only 100 parts of polyethylene resin particles used in Example 1 (commercial name: Mirason ACE-30N, produced by Mitsui Polychemical Co.) were used without using the polyethylene resin particles produced in Example 1. This sheet has a thickness of 0.32 mm and a width of 405 mm just after extrusion and a thickness of 1.05 mm and a width of 426 mm after ageing. The density of this sheet was 0.65 g/cm$^3$. The sheet had many stripe-like patterns in the extruding direction.

While the invention has been described in detail and with reference to specific embodiments thereof, it will be apparent to one skilled in the art that various changes and modifications can be made therein without departing from the spirit and scope thereof.

What is claimed is:

1. A process for producing foamable polyethylene resin particles which comprises the steps of:

(a) suspending in an aqueous medium polyethylene resin particles having an MI value of 0.3 to 10, a density of less than 0.93 g/cm$^3$ and a softening point below 90° C.;

(b) adding to said aqueous suspension 30 to 300% by weight based on the weight of said particles of a styrene monomer and a catalyst for polymerizing said monomer;

(c) polymerizing said monomer in the interior of said polyethylene resin particles; and (d) impregnating, after the polymerization, a blowing agent into the resulting polyethylene resin particles which contain a polystyrene resin formed by the polymerization of said styrene monomer at a temperature below the softening point of said polyethylene resin particles, wherein said blowing agent does not substantially reduce the viscosity of the polymerization system, does not dissolve said resin particles or only slightly swells the polyethylene resin particles, said polyethylene resin particles exhibiting excellent foaming ability and blowing agent retention.

2. The process for producing foamable polyethylene resin particles of claim 1, wherein said polyethylene resin is an ethylene homopolymer or copolymer containing ethylene as a major component with a monomer selected from the group consisting of vinyl chloride, vinyl acetate and methyl methacrylate.

3. The process for producing foamable polyethylene resin particles of claim 1, wherein said styrene monomer is styrene or a mixture of a major amount of styrene and a copolymerizable monomer selected from the group consisting of α-methyl styrene, acrylonitrile, methyl methacrylate, dimethyl maleate and divinyl benzene.

4. The process for producing foamable polyethylene resin particles of claim 1, wherein said aqueous medium contains a suspending agent.

5. The process for producing foamable polyethylene resin particles of claim 1, wherein said catalyst is an organic peroxide or an azo compound.

6. The process for producing foamable polyethylene resin particles of claim 1, wherein said blowing agent is an aliphatic hydrocarbon, a cycloaliphatic hydrocarbon, or a halogenated hydrocarbon.

7. The process for producing foamable polyethylene resin particles of claim 1, wherein said blowing agent is present in an amount of about 5 to 20% by weight based on the weight of the foamable polyethylene resin particles.

8. The process for producing foamable polyethylene resin particles of claim 1, wherein said polymerizing is at a temperature of from about 80° C. to 120° C.

9. The process for producing foamable polyethylene resin particles of claim 1, wherein said aqueous medium polyethylene resin particles have a softening point below 85° C. and said styrene monomer is added in an amount of 30 to 100% by weight based on the weight of said particles

* * * * *